United States Patent
Aker et al.

(10) Patent No.: US 8,083,147 B2
(45) Date of Patent: Dec. 27, 2011

(54) ARRANGEMENT FOR AND METHOD OF CONTROLLING IMAGE EXPOSURE IN AN IMAGING READER

(75) Inventors: Wynn Aker, Manorville, NY (US); Matthew Blasczak, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 502 days.

(21) Appl. No.: 12/316,860

(22) Filed: Dec. 17, 2008

(65) Prior Publication Data

US 2010/0147947 A1 Jun. 17, 2010

(51) Int. Cl.
*G06K 7/10* (2006.01)

(52) U.S. Cl. ........... 235/462.42; 235/462.4; 235/462.41; 235/462.06

(58) Field of Classification Search .............. 235/462.4, 235/462.41, 462.42, 462.06
See application file for complete search history.

(56) References Cited

U.S. PATENT DOCUMENTS

| 7,494,065 B2 * | 2/2009 | Barkan et al. ........... 235/472.01 |
| 2006/0138234 A1 | 6/2006 | Joseph et al. |
| 2007/0272756 A1 | 11/2007 | Brock et al. |

FOREIGN PATENT DOCUMENTS

EP 0959425 11/1999

OTHER PUBLICATIONS

International Search Report and Written Opinion dated May 4, 2010 in related case PCT/US2009/067887.

* cited by examiner

*Primary Examiner* — Karl D. Frech
(74) *Attorney, Agent, or Firm* — Nong-Qiang Fan

(57) ABSTRACT

An arrangement for, and a method of, controlling image exposure in an imaging reader for reading symbols, employ an illuminating light assembly for illuminating a symbol with illumination light, a solid-state imager for capturing return light from the symbol over a field of view, and a controller for successively exposing the imager over a first exposure time period to capture the return light from, and to optimally image, a first area of the symbol, and over a second exposure time period to capture the return light from, and to optimally image, a second area of the symbol. The first and the second areas have different light intensity levels. The first and the second exposure time periods are different in duration. The controller is operative for combining the optimally imaged first and second areas to read the symbol.

18 Claims, 2 Drawing Sheets

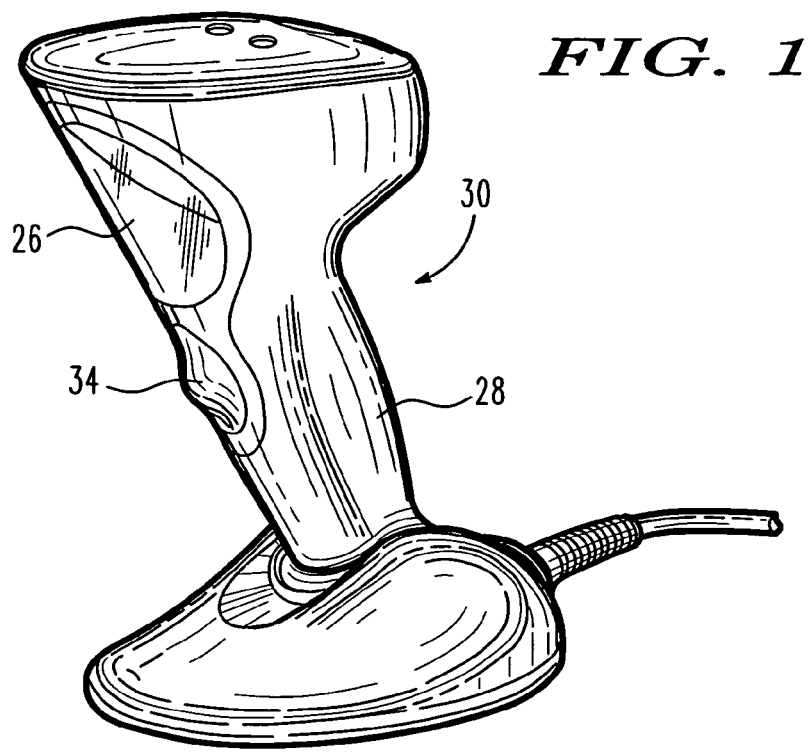
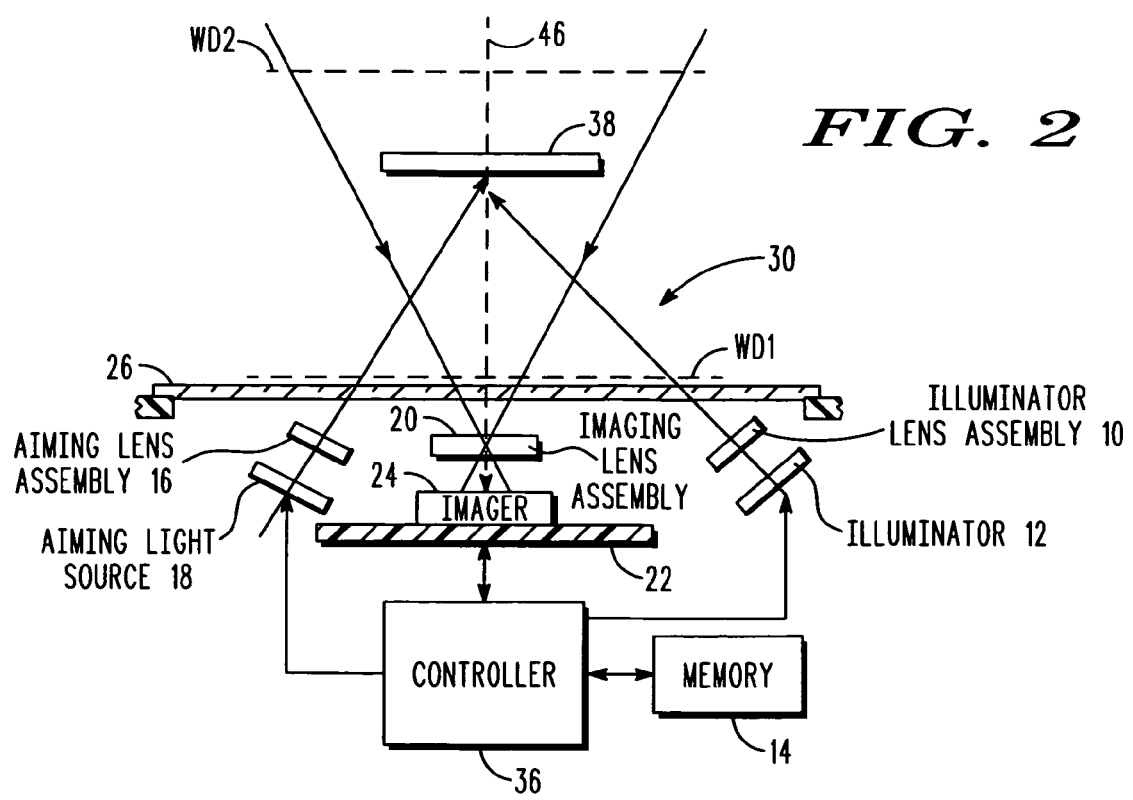

ARRANGEMENT FOR AND METHOD OF CONTROLLING IMAGE EXPOSURE IN AN IMAGING READER

DESCRIPTION OF THE RELATED ART

Solid-state imaging systems or imaging readers, as well as moving laser beam readers or laser scanners, have both been used to electro-optically read targets, such as one-dimensional bar code symbols, particularly of the Universal Product Code (UPC) type, each having a row of bars and spaces spaced apart along one direction, as well as two-dimensional symbols, such as Code 49, which introduced the concept of vertically stacking a plurality of rows of bar and space patterns in a single symbol, as described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes an imaging module having a solid-state imager with a sensor array of cells or photosensors, which correspond to image elements or pixels in a field of view of the imager, and an imaging lens assembly for capturing return light scattered and/or reflected from the symbol being imaged, and for projecting the return light onto the sensor array to initiate capture of an image of the symbol. Such an imager may include a one- or two-dimensional charge coupled device (CCD) or a complementary metal oxide semiconductor (CMOS) device and associated circuits for producing and processing electronic signals corresponding to a one- or two-dimensional array of pixel information over the field of view. The imager captures the return light over an exposure time period set under automatic control of a controller or programmed microprocessor that is also operative for processing the electrical signals into data indicative of the symbol being imaged and read.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

In order to increase the amount of the return light captured by the imager, especially in dimly lit environments and/or at far range reading, the imaging reader generally also includes an illuminating light assembly, also under automatic setting control of the controller, for illuminating the symbol with illumination light for reflection and scattering therefrom. The illumination is preferably pulsed for an illumination time period that is in synchronism with the exposure time period, but can also be continuous.

Yet, as advantageous and as reliable as such imaging readers are in reading symbols, one concern relates to the level and uniformity of the illumination light at and across the symbols, especially when the symbols can be located anywhere within a range of working distances relative to the reader. The illumination light returned from the symbol might be either too dark, or too bright, thereby leading in both cases to an unsuccessful decoding and processing of the captured image. More often, the illuminated symbol might have one or more dark illuminated areas (i.e., "shadows") and/or one or more bright illuminated areas (i.e., "highlights"). An automatic exposure control setting adjusted for the shadows is unsuitable for the highlights, and vice versa, thereby again often leading to an unsuccessful decoding and processing of the captured image.

The imager can be characterized, for a given exposure control setting, by its dynamic range, which is a measure of the ratio of the darkest to the brightest light level able to be captured by the imager, as well as by its clipping characteristic, which is the brightest level of the light able to be detected by the imager. Light incident on the imager above this brightest level will cause the imager to output all output signals at maximum values, with no variation between the bars and spaces that comprise the symbol.

Most imagers are only able to capture about 5 stops of dynamic range. A "stop" is a photographic term defined as a doubling of light level. An image of a symbol illuminated to exceed the 5 stop range will either be too dim to be captured for a given exposure control setting, or too bright and be clipped for the given exposure control setting. Thus, a single exposure control setting for the imager cannot reliably enable an image having one or more shadows and/or one or more highlights to be captured by the imager and successfully decoded and read, thereby degrading symbol reading performance.

SUMMARY OF THE INVENTION

One feature of the present invention resides, briefly stated, in an arrangement for, and a method of, controlling image exposure in an imaging reader for reading symbols. The arrangement includes an illuminating light assembly supported by the reader for illuminating a symbol with illumination light. Preferably, the illuminating light assembly includes one or more light emitting diodes (LEDs) for emitting the illumination light as one or more light pulses.

The arrangement further includes a solid-state imager supported by the reader and having an array of image sensors for capturing return light from the symbol over a field of view. Preferably, the imager is a charge coupled device (CCD) or a complementary metal oxide semiconductor (CMOS) device, with a rolling or a global shutter. The array may be one-dimensional, i.e., linear arranged along a single row, or two-dimensional having mutually orthogonal multiple rows and columns.

The arrangement also includes a controller or programmed microprocessor operatively connected to the illuminating light assembly and the imager, for successively exposing the imager over a first exposure time period during which the LED is energized to capture the return light from, and to optimally image, a first area of the symbol, and over a second exposure time period during which the LED is again energized to capture the return light from, and to optimally image, a second area of the symbol. The first and the second areas have different light intensity levels, e.g., the aforementioned shadows and highlights. The exposure time periods are different in duration. The controller is further operative for combining the optimally imaged first and second areas to read the entire symbol.

One of the exposure time periods is longer in duration than the other of the exposure time periods. By way of non-limiting numerical example, in the preferred embodiment, one of the exposure time periods could last about 3 milliseconds, and the other of the exposure time periods could last about 8 milliseconds. The longer 8 millisecond exposure time period is better suited for capturing the return light from the shadows, while the shorter 3 millisecond exposure time period is better suited for capturing the return light from the highlights. More than two exposure time periods can be employed. The longer and shorter time periods need not immediately alternate with each other, and furthermore, their order may vary.

The longer time periods, for example, can be repeated a number of times before the shorter time periods are employed, and vice versa.

Thus, in accordance with an aspect of this invention, a single exposure control setting is not automatically established by the controller for the imager. As discussed above, such a single setting cannot reliably enable an image having one or more shadows and/or one or more highlights to be captured by the imager and successfully decoded and read. Instead, the controller establishes more than one exposure control setting, one of which is optimized for capturing the return light from the shadows, while the other of which is optimized for capturing the return light from the highlights. By stitching the optimally imaged first and second areas together, the controller then enables the entire symbol, despite the presence of shadows and/or highlights, to be successfully decoded and read.

In a preferred embodiment, the controller exposes the imager over the shorter exposure time period to obtain a first image, optimized for the bright areas or highlights of the image. The controller also exposes the imager for the longer exposure time period to obtain a second image, optimized for the darker areas or shadows of the image. The controller then generates a new resultant image by averaging the first image with the second image. The averaging process computes a numerical average, on a pixel per pixel basis. For example, pixel 1 of the resultant image is the numerical average of pixel 1 of the first image, and pixel 1 of the second image, and so forth. The resultant image can alternatively be an average of more than two images. This new averaged resultant image can then be decoded by a decoding algorithm of the controller. The controller may optionally attempt to decode either of the first or second images captured using the shorter or the longer exposure time periods, prior to decoding the averaged resultant image.

Averaging is just one way to combine the first image with the shorter exposure time period and the second image with the longer exposure time period. Another way to combine the first and the second images is to use a region of interest (ROI) analysis. For example, the first image can be analyzed to determine which regions of the first image could be considered decodable, and these regions can be stitched together with the regions of the second image that are considered decodable.

The shorter and the longer exposure time periods are set by the controller. In one so-called brute force approach, the controller can arbitrarily choose two manual exposure time periods of different duration. The controller can select the manual exposure time periods after disabling an autoexposure setting for the imager. If an image is captured before the autoexposure setting is disabled, the controller could use this captured image, and intelligently look for regions that are too dark or too bright, and then compute what would be optimal exposure time periods for the first and second images to be taken, prior to combining, averaging, or stitching the first and the second images. If the brute force approach of selecting two manual exposure time periods does not initially work, then the controller could select two other different manual exposure time periods.

The method of controlling image exposure in an imaging reader for reading symbols is performed by illuminating a symbol with illumination light, by capturing return light from the symbol over a field of view of a solid-state imager, by successively exposing the imager over a first exposure time period to capture the return light from, and to optimally image, a first area of the symbol, and over a second exposure time period to capture the return light from, and to optimally image, a second area of the symbol, and by combining the optimally imaged first and second areas to read the symbol. The first and the second areas, e.g., shadows and highlights, have different light intensity levels. The first and the second exposure time periods are different in duration. Advantageously, the longer exposure time period is employed to capture the return light from the shadows, while the shorter exposure time period is employed to capture the return light from the highlights.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a portable imaging reader operative in either a handheld mode, or a hands-free mode, for capturing return light from target symbols;

FIG. 2 is a schematic diagram of various components of the reader of FIG. 1.

DETAILED DESCRIPTION OF THE PREFERRED EMBODIMENTS

Figure 3:
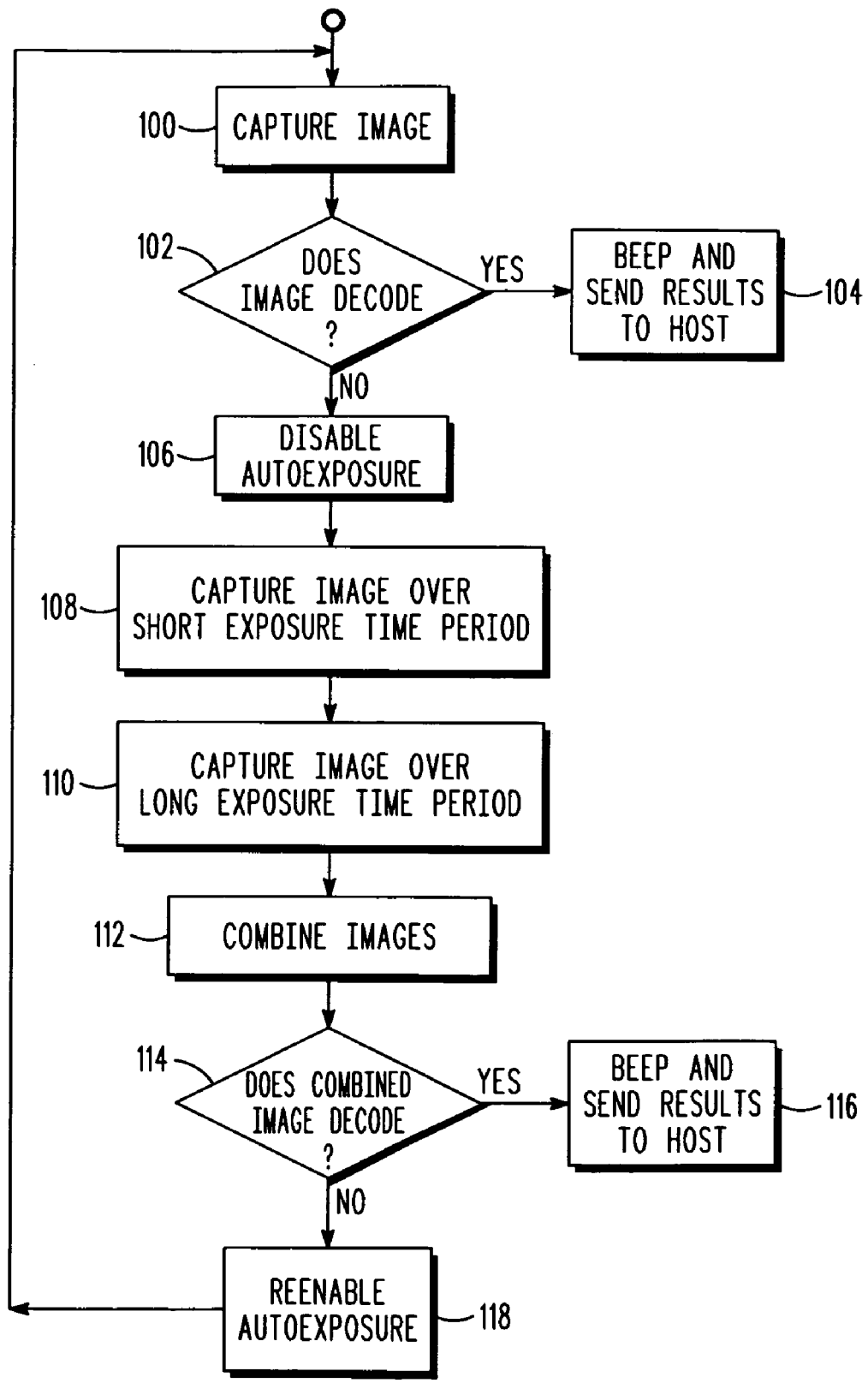
FIG. 3 is a flow chart depicting operation of the components of the reader of FIG. 1 in accordance with this invention.

Reference numeral 30 in FIG. 1 generally identifies an imaging reader having a generally vertical window 26 and a gun-shaped housing 28 supported by a base 32 for supporting the imaging reader 30 on a support surface such as a countertop. The imaging reader 30 can thus be used in a hands-free mode as a stationary workstation in which products are slid, swiped past, or presented to, the vertical window 26, or can be picked up off the countertop and held in an operator's hand and used in a handheld mode in which the reader is moved and a trigger 34 is manually depressed to initiate imaging of indicia, especially one- or two-dimensional symbols, to be read at working distances from the window 26. In another variation, the base 32 can be omitted, and housings of other configurations can be employed. A cable, as illustrated in FIG. 1, connected to the base 32 can also be omitted, in which case, the reader 30 communicates with a remote host by a wireless link, and the reader is electrically powered by an on-board battery.

As schematically shown in FIG. 2, an imager 24 is mounted on a printed circuit board 22 in the reader. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, and operative, when exposed, for detecting return light captured by an imaging lens assembly 20 along an optical path or axis 46 through the window 26. The return light is scattered and/or reflected from a target or symbol 38 over a field of view of the imager. The imaging lens assembly 20 is operative for adjustably focusing the return light onto the array of image sensors to enable the symbol 38 to be read. The symbol 38 is located anywhere in a working range of distances between a close-in working distance (WD1) and a far-out working distance (WD2). In a preferred embodiment, WD1 is about four to six inches from the imager array 24, and WD2 can be many feet from the window 26, for example, around fifty feet away.

An illuminating assembly is also mounted in the imaging reader and preferably includes an illuminator or illuminating light source 12, e.g., one or more light emitting diodes (LEDs), and an illuminating lens assembly 10 to uniformly illuminate the symbol 38 with an illuminating light. The LED 12 is energized to emit the illuminating light, preferably as pulses synchronized with the exposure of the imager 24.

An aiming assembly is also mounted in the imaging reader and preferably includes an aiming light source 18, e.g., an LED, and an aiming lens assembly 16 for generating a visible aiming light pattern on the symbol 38. The aiming pattern is useful to help the operator accurately aim the reader at the symbol 38.

As shown in FIG. 2, the imager 24, the illuminating light source 12 and the aiming light source 18 are operatively connected to a controller or programmed microprocessor 36 operatively connected to a memory 14, for controlling the operation of these components. Preferably, the controller 36 is the same as the one used for processing the return light from target symbols and for decoding the captured target images. In operation, the controller 36 sends a command signal to energize the aiming light source 18 prior to reading, and thereafter, energizes the illuminating light source 12 to emit the illumination light, and also energizes and exposes the imager 24 to collect return light, e.g., illumination light and/or ambient light, from the symbol. A typical array needs about 18-33 milliseconds to acquire the entire target image and operates at a frame rate of about 30-60 frames per second.

In accordance with the prior art, as discussed above, the controller 36 sets a single exposure time period for the imager 24 to collect light while the illuminating light source 12 is energized. This single exposure time period is typically established with the aid of a rangefinder that determines the distance to the symbol 38 and adjusts the imaging lens assembly 20 accordingly. However, a single exposure time period cannot reliably enable an image having one or more shadows and/or one or more highlights to be captured by the imager 24 and successfully decoded and read.

Hence, in accordance with one aspect of this invention, the controller 36 is operative for successively exposing the imager 24 over a first exposure time period during which the LED 12 is energized to capture the return light from, and to optimally image, a first area of the symbol, and over a second exposure time period during which the LED 12 is again energized to capture the return light from, and to optimally image, a second area of the symbol. The first and the second areas have different light intensity levels, e.g., the aforementioned shadows and highlights. The exposure time periods are different in duration. The controller 36 is further operative for combining the optimally imaged first and second areas to read the entire symbol.

One of the exposure time periods is longer in duration than the other of the exposure time periods. By way of non-limiting numerical example, in the preferred embodiment, one of the exposure time periods could last about 3 milliseconds, and the other of the exposure time periods could last about 8 milliseconds. The longer 8 milliseconds exposure time period is better suited for capturing the return light from the shadows, while the shorter 3 milliseconds exposure time period is better suited for capturing the return light from the highlights. More than two exposure time periods can be employed. The longer and shorter time periods need not immediately alternate with each other, and furthermore, their order may vary. The longer time periods, for example, can be repeated a number of times before the shorter time periods are employed, and vice versa. Advantageously, the longer and shorter time periods follow each other in successive image frames to minimize the effects of hand jitter when a handheld reader is used, and/or the effects of relative motion between the symbol and the reader.

Thus, the controller 36 establishes more than one exposure control setting, one of which is optimized for capturing the return light from the shadows, while the other of which is optimized for capturing the return light from the highlights. By stitching the optimally imaged first and second areas together, the controller 36 then enables the entire symbol, despite the presence of shadows and/or highlights, to be successfully decoded and read.

In a preferred embodiment, the controller 36 exposes the imager 24 over the shorter exposure time period to obtain a first image, optimized for the bright areas or highlights of the image. The controller 36 also exposes the imager 24 for the longer exposure time period to obtain a second image, optimized for the darker areas or shadows of the image. The controller 36 then generates a new resultant image by averaging the first image with the second image. The averaging process computes a numerical average, on a pixel per pixel basis. For example, pixel 1 of the resultant image is the numerical average of pixel 1 of the first image, and pixel 1 of the second image, and so forth. The resultant image can alternatively be an average of more than two images. This new averaged resultant image can then be decoded by a decoding algorithm of the controller 36. The controller 36 may optionally attempt to decode either of the first or second images captured using the shorter or the longer exposure time periods, prior to decoding the averaged resultant image.

In another variant, the controller 36 exposes the imager 24 over the shorter exposure time period to obtain a plurality of first images, each optimized for the bright areas or highlights of the image. The controller 36 then averages the plurality of first images to obtain an average first image. The controller 36 also exposes the imager 24 for the longer exposure time period to obtain a plurality of second images, each optimized for the darker areas or shadows of the image. The controller 36 then averages the plurality of second images to obtain an average second image. The controller 36 then generates a new resultant image by averaging the average first image with the average second image, again on a pixel per pixel basis, as described above.

Averaging is just one way to combine the first image with the shorter exposure time period and the second image with the longer exposure time period. Another way to combine the first and the second images is to use a region of interest (ROI) analysis. For example, the first image can be analyzed to determine which regions of the first image could be considered decodable, and these regions can be stitched together with the regions of the second image that are considered decodable.

The shorter and the longer exposure time periods are set by the controller 36. In one so-called brute force approach, the controller 36 can arbitrarily choose two manual exposure time periods of different duration. The controller 36 can select the manual exposure time periods after disabling an autoexposure setting for the imager 24. If an image is captured before the autoexposure setting is disabled, the controller 36 could use this captured image, and intelligently look for regions that are too dark or too bright, and then compute what would be optimal exposure time periods for the first and second images to be taken, prior to combining, averaging, or stitching the first and the second images. If the brute force approach of selecting two manual exposure time periods does not initially work, then the controller 36 could select two other different manual exposure time periods.

The stitching method in connection with an imaging reader is described in commonly-assigned U.S. Pat. No. 7,344,080, the entire contents of which are incorporated herein by reference thereto. A bar code symbol sequence stitching method utilizing a buffer memory is disclosed in commonly-assigned U.S. Pat. No. 5,821,519, the entire contents of which are also incorporated herein by reference thereto. Another reference disclosing sequence stitching methodologies is a book entitled "Algorithms on Strings, Trees, and Sequences: Computer Science and Computational Biology", by Dan Gusfield, published by the Press Syndicate of the University of Cambridge, Cambridge, England, copyright 1997, ISBN 0-521-58519-8 (hc). This book is likewise incorporated herein in its entirety by reference.

As depicted in the flow chart of FIG. 3, image capture is attempted in block 100. If the image is successfully decoded at block 102, then the controller 36 will cause a beep or like indicator to indicate that a successful decode has occurred and send the results to a remote host at block 104. If not, then the autoexposure setting is disabled by the controller 36 at block 106, and the controller 36 exposes the imager 24 to capture a first image over a manual short exposure time period to adequately expose the highlights of the image (block 108) and to capture a second image over a manual long exposure time period to adequately expose the shadows of the image (block 110). The first and the second images are then combined together at block 112 to form a new resultant image. If the resultant image is successfully decoded at block 114, then the controller 36 will cause a beep or like indicator to indicate that a successful decode has occurred and send the results to a remote host at block 116. If not, then the autoexposure setting is re-enabled by the controller 36 at block 118, and the process is repeated.

It will be understood that each of the elements described above, or two or more together, also may find a useful application in other types of constructions differing from the types described above. For example, the illumination light source 12 need not be an LED, but could be a laser, a strobe, a xenon flash lamp, or another type of light source.

While the invention has been illustrated and described as an arrangement for, and a method of, controlling image exposure in an imaging reader, it is not intended to be limited to the details shown, since various modifications and structural changes may be made without departing in any way from the spirit of the present invention. For example, this invention is not to be limited solely to imaging readers whose only function is to image bar code symbols, but could equally apply to mobile computers or terminals having an imager as one of its subsystems.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for controlling image exposure in an imaging reader for reading symbols, comprising:
   an illuminating light assembly supported by the reader for illuminating a symbol with illumination light;
   a solid-state imager supported by the reader and having an array of image sensors for capturing return light from the symbol over a field of view;
   a controller operatively connected to the illuminating light assembly and the imager, for successively exposing the imager over a first exposure time period to capture the return light from, and to optimally image, a first area of the symbol, and over a second exposure time period to capture the return light from, and to optimally image, a second area of the symbol, the first and the second areas having different light intensity levels, the first and the second exposure time periods being different in duration, and the controller being operative for combining the optimally imaged first and second areas to read the symbol; and
   wherein the controller stitches the optimally imaged first and second areas together.

2. The arrangement of claim 1, wherein the illuminating light assembly includes a light emitting diode (LED), and wherein the controller energizes the LED to successively emit the illumination light during the first and the second exposure time periods.

3. The arrangement of claim 1, wherein the array is one of a one- and a two-dimensional array.

4. The arrangement of claim 1, wherein one of the exposure time periods is longer in duration than the other of the exposure time periods, and wherein the return light captured from one of the areas is lower in intensity than the return light captured from the other of the areas.

5. The arrangement of claim 4, wherein the controller exposes the imager over the one exposure time period to capture the return light from the one area, and exposes the imager over the other exposure time period to capture the return light from the other area.

6. The arrangement of claim 1, wherein the controller averages the optimally imaged first and second areas together.

7. The arrangement of claim 1, wherein the controller selects predetermined values for the first and second exposure time periods prior to capture of the return light.

8. The arrangement of claim 1, wherein the controller selects optimum values for the first and second exposure time periods after capture of the return light.

9. The arrangement of claim 1, wherein the controller sets an autoexposure setting for the imager, analyzes the image taken with the autoexposure setting, and selects optimum values for the first and second exposure time periods after analysis of the image.

10. An arrangement for controlling image exposure in an imaging reader for reading symbols, comprising:
    means for illuminating a symbol with illumination light;
    means for capturing return light from the symbol over a field of view; and
    means for successively exposing the capturing means over a first exposure time period to capture the return light from, and to optimally image, a first area of the symbol, and over a second exposure time period to capture the return light from, and to optimally image, a second area of the symbol, the first and the second areas having different light intensity levels, the first and the second exposure time periods being different in duration, and means for combining the optimally imaged first and second areas to read the symbol and stitching the optimally imaged first and second areas together.

11. A method of controlling image exposure in an imaging reader for reading symbols, comprising the steps of:
    illuminating a symbol with illumination light; capturing return light from the symbol over a field of view of a solid-state imager;
    successively exposing the imager over a first exposure time period to capture the return light from, and to optimally image, a first area of the symbol, and over a second exposure time period to capture the return light from, and to optimally image, a second area of the symbol, the first and the second areas having different light intensity levels, the first and the second exposure time periods being different in duration;

combining the optimally imaged first and second areas to read the symbol; and stitching the optimally imaged first and second areas together.

12. The method of claim 11, wherein the illuminating step is performed by energizing a light emitting diode to successively emit the illumination light during the first and the second exposure time periods.

13. The method of claim 11, and configuring one of the exposure time periods to be longer in duration than the other of the exposure time periods, and wherein the return light captured from one of the areas is lower in intensity than the return light captured from the other of the areas.

14. The method of claim 13, wherein the exposing step is performed by exposing the imager over the one exposure time period to capture the return light from the one area.

15. The method of claim 11, and averaging the optimally imaged first and second areas together.

16. The method of claim 11, and selecting predetermined values for the first and second exposure time periods prior to capture of the return light.

17. The method of claim 11, and selecting optimum values for the first and second exposure time periods after capture of the return light 18. The method of claim 11, and setting an autoexposure setting for the imager, analyzing the image taken with the autoexposure setting, and selecting optimum values for the first and second exposure time periods after analysis of the image.

\* \* \* \* \*